(12) United States Patent
Mann

(10) Patent No.: US 7,365,646 B1
(45) Date of Patent: Apr. 29, 2008

(54) CHILDREN'S POTTY ALARM

(76) Inventor: Nicole H. Mann, 1120 Bulen Ave., Columbus, OH (US) 43206

( * ) Notice: Subject to any disclaimer, the term of this patent is extended or adjusted under 35 U.S.C. 154(b) by 227 days.

(21) Appl. No.: 11/268,805

(22) Filed: Nov. 7, 2005

(51) Int. Cl.
G09B 19/00 (2006.01)
G08B 3/00 (2006.01)
G08B 23/00 (2006.01)
G08B 5/36 (2006.01)
G08B 5/00 (2006.01)

(52) U.S. Cl. .............. 340/573.1; 340/691.2; 340/573.5; 340/815.5; 434/238

(58) Field of Classification Search .. 340/691.1–691.8, 340/539.1–539.15, 500–502, 573.1, 573.5, 340/603–605, 815.49, 815.5; 434/262, 267, 434/268, 236–238; 463/30–35, 40, 46, 47; 4/34; 446/82–84
See application file for complete search history.

(56) References Cited

U.S. PATENT DOCUMENTS

| 4,162,490 A | * | 7/1979 | Fu et al. ................... 340/603 |
| 4,883,749 A | * | 11/1989 | Roberts et al. ............. 434/247 |
| 5,560,051 A | * | 10/1996 | Butts ............................. 4/479 |
| 5,652,975 A | * | 8/1997 | Hoskin ......................... 4/661 |
| 5,686,882 A | * | 11/1997 | Giani ...................... 340/407.1 |
| 5,725,382 A | * | 3/1998 | Walter et al. ............... 434/258 |
| 6,022,273 A | * | 2/2000 | Gabai et al. .................. 463/39 |
| 6,037,871 A | * | 3/2000 | Babylon .................. 340/573.1 |
| 6,072,384 A | * | 6/2000 | Baker ...................... 340/309.7 |
| 6,988,896 B2 | * | 1/2006 | Cho ............................ 434/365 |
| 7,194,776 B1 | * | 3/2007 | Lastuka et al. ............... 4/661 |
| 2007/0009879 A1 | * | 1/2007 | Kentof ....................... 434/365 |

* cited by examiner

Primary Examiner—Benjamin C. Lee
Assistant Examiner—Jennifer Mehmood

(57) ABSTRACT

A children's potty alarm is disclosed. The children's potty alarm includes a base. A simulated bedroom/bathroom setting which may include a dancing bear or other character is provided on the base. A microprocessor is provided in the base. A speaker is connected to the microprocessor and provided on the base and broadcasts motivational sentences, phrases and/or songs sounds from the speaker upon activation of the alarm to awaken and motivate a child to use a bathroom at predetermined intervals.

16 Claims, 3 Drawing Sheets

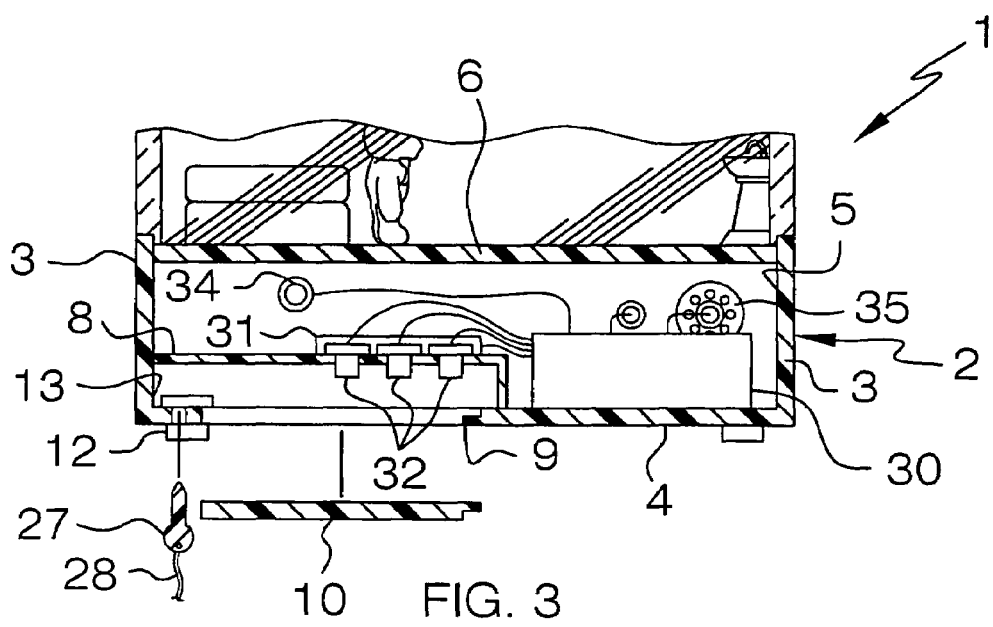
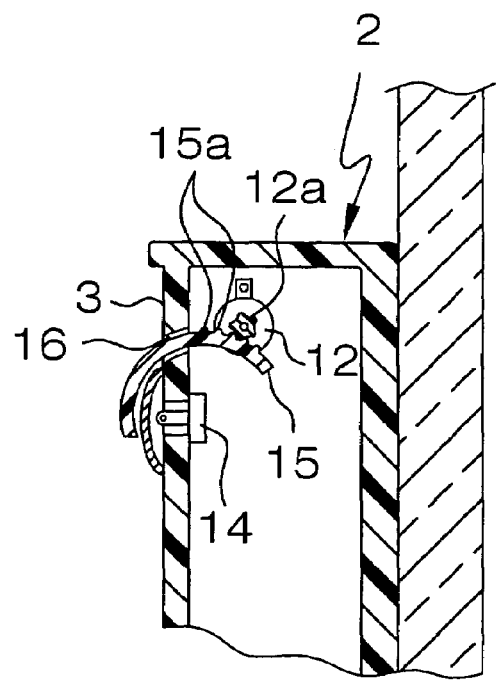
FIG. 4

CHILDREN'S POTTY ALARM

FIELD OF THE INVENTION

The present invention relates to alarms. More particularly, the present invention relates to a children's potty alarm which is entertaining for small children and reminds children to visit the restroom at selected timed intervals during potty training.

BACKGROUND OF THE INVENTION

Potty training is a major rite-of-passage for small children. Various methods are used by parents and other caregivers to train children to use the restroom when needed. This includes offering rewards to a child when he or she timely meets his or her bathroom needs.

What is needed is a potty alarm which is entertaining to small children and reminds children undergoing potty training when it is time to visit the restroom at programmed time intervals. Over time, such an alarm would instill in a child the need to use the restroom at regular intervals in order to timely meet the child's bathroom needs.

SUMMARY OF THE INVENTION

The present invention is generally directed to a children's potty alarm. The children's potty alarm includes a base. A simulated bedroom/bathroom setting which may include a dancing bear or other character is provided on the base. A microprocessor is provided in the base. A speaker is connected to the microprocessor and provided on the base and broadcasts motivational sentences, phrases and/or songs sounds from the speaker upon activation of the alarm to awaken and motivate a child to use a bathroom at predetermined intervals.

BRIEF DESCRIPTION OF THE DRAWINGS

The invention will now be described, by way of example, with reference to the accompanying drawings, in which:

FIG. 3 is a sectional view, taken along section lines 3-3 in FIG. 2;

FIG. 4 is a sectional view of a base component of the children's potty alarm, more particularly illustrating an illustrative technique for blocking access to a panel cover release button on the children's potty alarm.

DETAILED DESCRIPTION OF THE INVENTION

Figure 1:
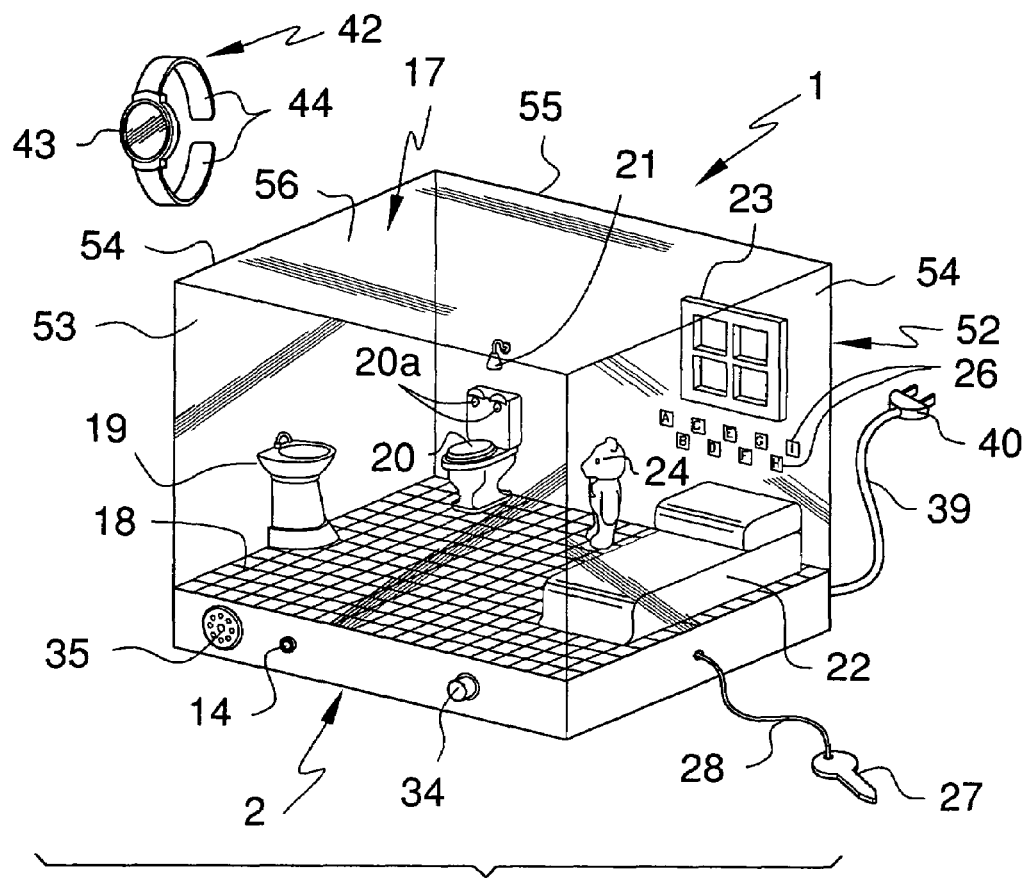
FIG. 1 is a perspective view of an illustrative embodiment of the children's potty alarm according to the present invention.

Referring to the drawings, an illustrative embodiment of the children's potty alarm according to the present invention is generally indicated by reference numeral 1. Briefly, the children's potty alarm 1 is entertaining to small children and is designed to remind a small child of the need to use the restroom at pre-programmed time intervals as the child is being potty trained. The children's potty alarm 1 typically includes a base 2, which contains the functional components of the children's potty alarm 1, and a transparent cover 52 provided on the base 2. A diorama-like setting 17 of a bathroom and children's bedroom is displayed on the base 2 and inside the cover 52, as will be hereinafter described.

As shown in FIG. 1, the simulated bedroom/bathroom setting 17 of the children's potty alarm 1 may include, for example, a simulated floor 18 having the likeness of floor tiles thereon; a lavatory 19; a toilet 20; a light 21 over the toilet 20; a bed 22; a window 23 in the cover 52, such as on the rear panel 55 of the cover 52, for example; and a bear 24 standing on the floor 18. The bear 24 may be dressed in male clothing, female clothing or in unisex clothing (such as pajamas, a sweater or a T-shirt, for example). The simulated bedroom/bathroom setting 17 may further include various other items which simulate those found in a small child's bedroom, such as, for example, alphabet blocks 26 provided typically on the rear panel 55 of the cover 52.

The cover 52 may be glass or plastic, for example, and may include a front panel 53, side panels 54, a rear panel 55 and a top panel 56. The rear panel 55 may be a solid or opaque material. The cover 52 may completely enclose the simulated bedroom/bathroom setting on the base 2. Alternatively, the cover 52 may partially enclose the simulated bedroom/bathroom setting, in which case the cover 52 need not necessarily be transparent. It is to be understood that the cover 52 may have numerous variations in shape and design. For example, the cover 52 may include the rear panel 55 only extending upwardly from the base 2; or may have the side panels 54, rear panel 55 and top panel 56 without the front panel 53. Still further in the alternative, the cover 52 may be omitted altogether. Preferably, the cover 52 includes the rear panel 55 to facilitate viewing of the simulated bedroom/bathroom setting 17 from various angles with only the rear view being blocked.

The base 2 may be generally rectangular, as shown, or may have any other suitable shape. As shown in FIG. 3, the base 2 may include multiple side walls 3, a bottom wall 4 and a top wall 6 which together define a base interior 5. The upper surface of the top wall 6 of the base 2 corresponds to the floor 18 of the simulated bedroom/bathroom setting 17. A control panel support 8 is provided in the base interior 5 and separates the base interior 5 from a control panel compartment 13. A control panel access slot 9 is provided typically in the bottom wall 4 and provides access to the control panel compartment 13.

Figure 2:
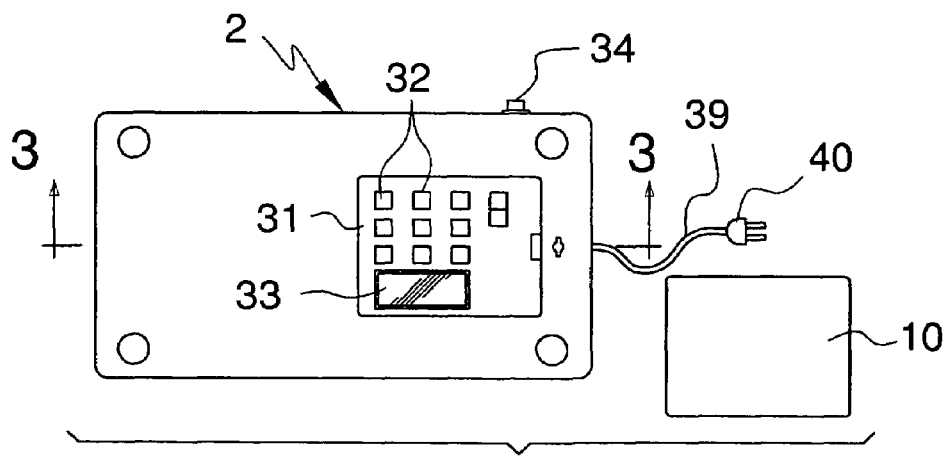
FIG. 2 is a front view of a control panel component of the children's potty alarm.
Figure 5:
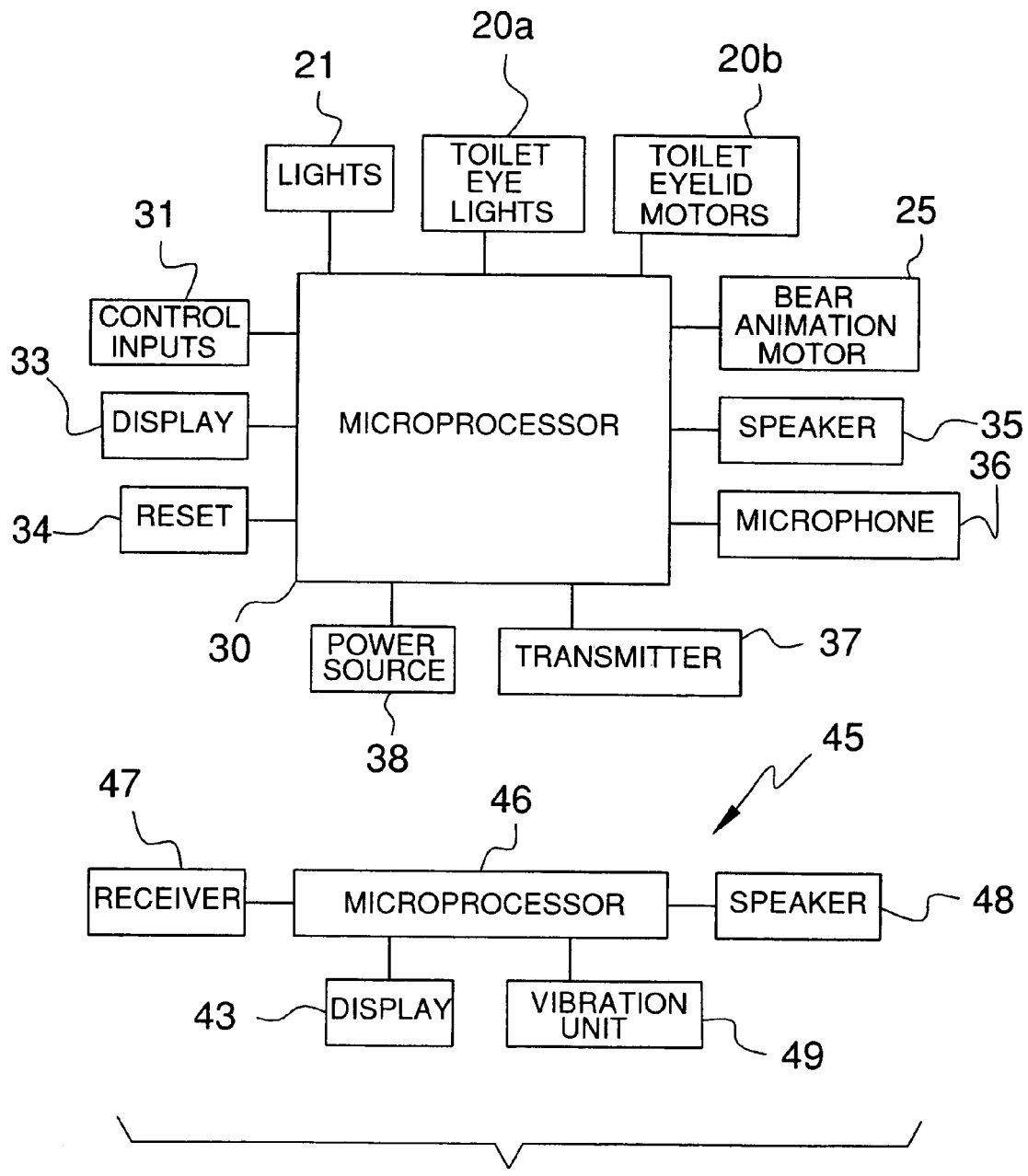
FIG. 5 is a block diagram of the various electrical components of the children's potty alarm.

As shown in FIG. 5, the functional components of the children's potty alarm 1 typically include a microprocessor 30, to which is attached a control panel 31 having multiple control buttons 32, as shown in FIG. 2. A display 33 is provided on the control panel 31 and connected to the microprocessor 30. As shown in FIG. 3, the control panel 31 may be mounted on the control panel support 8 in such a manner that the control buttons 32 and the display 33 face the control panel compartment 13 in the base 2. A reset button 34, the purpose of which will be hereinafter described, is connected to the microprocessor 30 and is provided on the exterior of the base 2, as shown in FIG. 1. A speaker 35 is connected to the microprocessor 30 and is also provided on the exterior of the base 2. Additional components may include a microphone 36 and a transmitter 37 connected to the microprocessor 30 for purposes which will be hereinafter described.

As further shown in FIG. 5, the light 21 over the toilet 20 in the simulated bedroom/bathroom setting 17 is connected to the microprocessor 30. Furthermore, the toilet 20 may be provided with toilet "eye" lights 20a, which simulate a pair of eyes on the toilet 20. A pair of eyelids (not shown) may be pivotally attached to the toilet 20 to normally cover the toilet eye lights 20a. A toilet eyelid motor 20b is connected to the microprocessor 30 and engages the eyelids (not shown) of the toilet eye lights 20a in such a manner that the eyelids pivot from a closed to an open position to expose the toilet eye lights 20a, as will be hereinafter further described.

A power source 38 is connected to the microprocessor 30. The power source 38 may be a battery (not shown), for example. Alternatively, the power source 38 may be a standard, 120-volt household electrical outlet (not shown) which may be connected to the microprocessor 30 through a power cord 39 having a plug 40. Also connected to the microprocessor 30 is a bear animation motor 25 which is typically contained in the base 2 and engages the bear 24 in the simulated bedroom/bathroom setting 17, typically through a slot (not shown) provided in the floor 18. When activated by the microprocessor 30, as will be hereinafter described, the bear animation motor 25 causes the bear 24 to "dance" or rock from side-to-side from the bed 22 to the toilet 20, and back to the bed 22.

The microprocessor 30 is programmed to perform multiple tasks upon time-determined activation of the children's potty alarm 1. Upon such activation, the microprocessor 30 causes the bear animation motor 25 to move the bear 24 from the bed 22 to the toilet 20, and back to the bed 22. Simultaneously, the microprocessor 30 illuminates the light 21 and the toilet eye lights 20a, as well as the toilet eyelid motor 20b, causing the toilet eyelid motor 20b to cause the toilet eyelids to expose the respective toilet eye lights 20a. The microprocessor 30 may also be programmed to broadcast various motivational phrases and/or sentences in the form of a song to a child through the speaker 35, as if the bear 24 were singing the phrases and/or sentences. For example, the microprocessor 30 may be programmed to broadcast the following in the form of a song: "It's potty time. Oh, it's potty time. It's time to go potty. Potty. It's potty time. Oh, it's potty time. It's time to go potty. Potty". The microprocessor 30 may be programmed to continue illumination of the light 21 and the toilet eye lights 20a, as well as activation of the toilet eyelid motor 20b and broadcasting of the motivational sentences and/or phrases from the speaker 35, until the reset button 34 is depressed. The microprocessor 30 may be programmed to broadcast congratulatory sentences and/or phrases, such as "Yeah, super job!", for example, upon depression of the reset button 34. The microprocessor 30 may be programmed to activate the children's potty alarm 1 at regular intervals (such as every 45 seconds, for example) until the reset button 34 is depressed. The microprocessor 30 may be programmed to return the bear 24 to the bed 22, by activation of the bear animation motor 25, as well as maintain illumination of the light 21 for 20 seconds, after depression of the reset button 34.

The buttons 32 on the control panel 31 are used to program into the microprocessor 30 the time intervals between successive activations of the children's potty alarm 1 (such as 30 minutes to 9 hours, for example), as well as the up/down volume of the singing, motivational sentences and/or phrases broadcast from the speaker 35. As they are entered into the microprocessor 30 by depression of the control buttons 32, the programmed time intervals and volume are indicated on the display 33. The time interval for the next activation of the children's potty alarm 1 is typically reset upon depression of the reset button 34.

As shown in FIG. 3, a panel cover 10 detachably engages the control panel access slot 9 of the base 2 to normally block access to the control panel 31. Accordingly, a cover release button 14 may be provided on the base 2. The cover release button 14 engages the panel cover 10 in such a manner that the cover release button 14 must be depressed in order to facilitate removal of the panel cover 10 from the control access slot 9. As shown in FIG. 4, a cover slot 16 may be provided in the base 2, adjacent to the cover release button 14. A generally arcuate or curved button cover 15 is slidably mounted in the cover slot 16. Multiple cover teeth 15a are provided on the button cover 15. A lock 12 is provided in the base 2 and includes a gear 12a which engages the cover teeth 15a of the button cover 15. Accordingly, a key 27 may be inserted in the lock 12 and rotated to cause progressive engagement of the gear 12a with the cover teeth 15a of the button cover 15. This exposes the release button 14 and facilitates removal of the panel cover 10 from the control panel compartment 13. The key 27 may be connected to the base 2 by a tether 28, for example, or may be kept separate from the children's potty alarm 1.

In typical use of the children's potty alarm 1, the microprocessor 30 is set to activate the various components of the children's potty alarm 1 at selected time intervals, typically ranging from 30 minutes to 9 hours, for example. At the pre-programmed time, the microprocessor 30 causes the bear 24 to "dance" or move from the bed 22 to the toilet 20 by activation of the bear animation motor 25; illuminate the light 21; activate the toilet eyelids by the toilet eyelid motors 20b and the toilet eye lights 20a; and broadcast the motivational sentences and/or phrases from the speaker 35. This awakens the child and motivates the child to arise and depress the reset button 34 to inactivate the children's potty alarm 1 prior to using the bathroom. The children's potty alarm 1 is repeatedly activated after predetermined time intervals (such as every 45 seconds, for example) until the reset button 34 is depressed. This resets the activation time interval for the children's potty alarm 1. Over time, the child is trailed to use the bathroom at regular intervals to avoid an accident.

In alternative use of the children's potty alarm 1, a recordable sound chip (not shown) may be provided in the microprocessor 30. A voice (such as that of a parent) may be recorded in the microprocessor 30 through the microphone 36 which is connected to the microprocessor 30. The recorded message (which may typically be 10-15 seconds long), instead of the programmed motivational singing and/or sentences or phrases, can then be broadcast from the speaker 35 upon each activation of the children's potty alarm 1.

As further shown in FIG. 1, the children's potty alarm 1 may further include a wrist band 42 which may be worn during the child at night. The wrist band 42 typically includes a display 43 and a band 44 which is fastened around the child's wrist (not shown). A control system 45 for the wrist band 42 is shown in FIG. 5 and includes a microprocessor 46, to which is attached the display 43. A receiver 47 and a speaker 48 are connected to the microprocessor 46. A vibration unit 49 is also connected to the microprocessor 46. Accordingly, upon each activation of the children's potty alarm 1, the microprocessor 30 transmits an activation signal to the receiver 47 of the wrist band 42. The microprocessor 46 activates the vibration unit 49, which vibrates the wrist band 42 on the child's wrist. Additionally, the microprocessor 46 may be programmed to broadcast sentences and/or phrases through the speaker 48, as well as illuminate the display 43 on the wrist band 42 to additionally ensure that the child awakens.

While the preferred embodiments of the invention have been described above, it will be recognized and understood that various modifications can be made in the invention and the appended claims are intended to cover all such modifications which may fall within the spirit and scope of the invention.

What is claimed is:

1. A children's potty alarm, comprising:
   a base;
   a simulated bedroom or bathroom setting carried by said base; wherein said simulated bedroom or bathroom setting comprises a bear and further comprising a bear animation motor connected to a microprocessor and operably engaging said bear for moving said bear upon activation of said alarm, wherein said simulated bedroom or bathroom setting comprises a bed and a toilet spaced-apart from said bed and wherein said bear is adapted to move from said bed to said toilet upon activation of said alarm;
   said microprocessor carried by said base; and
   a speaker connected to said microprocessor and carried by said base for broadcasting motivational sounds from said speaker upon activation of said alarm.

2. The children's potty alarm of claim 1 further comprising a pair of toilet eye lights carried by said toilet and connected to said microprocessor for illumination upon activation of said alarm.

3. The children's potty alarm of claim 1 further comprising a light provided above said toilet and connected to said microprocessor for illumination upon activation of said alarm.

4. The children's potty alarm of claim 1 wherein said simulated bedroom or bathroom setting comprises a lavatory.

5. The children's potty alarm of claim 1 further comprising a control panel provided in said base and connected to said microprocessor.

6. The children's potty alarm of claim 1 further comprising a microphone connected to said microprocessor for recording sounds into said microprocessor.

7. A children's potty alarm, comprising:
   a base;
   a simulated bedroom or bathroom setting carried by said base; wherein said simulated bedroom or bathroom setting comprises a bed, a toilet and a bear, and further comprising a bear animation motor connected to a microprocessor and engaging said bear for moving said bear between said bed and said toilet upon activation of said alarm;
   said microprocessor carried by said base;
   a speaker connected to said microprocessor and carried by said base for broadcasting motivational sounds from said speaker upon activation of said alarm; and
   a rear panel carried by said base and extending adjacent to said simulated bedroom or bathroom setting.

8. The children's potty alarm of claim 7 further comprising a cover carried by said base and covering said simulated bedroom or bathroom setting, and wherein said rear panel is part of said cover.

9. The children's potty alarm of claim 8 wherein said cover comprises a pair of side panels carried by said rear panel and a top panel carried by said pair of side panels and said rear panel.

10. The children's potty alarm of claim 9 further comprising a front panel carried by said pair of side panels and said top panel.

11. The children's potty alarm of claim 7 further comprising a pair of toilet eye lights carried by said toilet and connected to said microprocessor for illumination upon activation of said alarm.

12. The children's potty alarm of claim 7 further comprising a light carried by said rear panel above said toilet and connected to said microprocessor for illumination upon activation of said alarm.

13. The children's potty alarm of claim 7 further comprising a control panel provided in said base and connected to said microprocessor, a control panel access slot provided in said base adjacent to said control panel and a panel cover detachably closing said control panel access slot.

14. A children's potty alarm, comprising:
   a base;
   a simulated bedroom or bathroom setting carried by said base; wherein said simulated bedroom or bathroom setting comprises a bed, a toilet and a bear, and further comprising a bear animation motor connected to a first microprocessor and engaging said bear for moving said bear between said bed and said toilet upon activation of said alarm and a pair of toilet eye lights carried by said toilet and connected to said first microprocessor for illumination upon activation of said alarm and a light above said toilet and connected to said first microprocessor for illumination upon activation of said alarm;
   said first microprocessor carried by said base;
   a speaker connected to said first microprocessor and carried by said base for broadcasting motivational sounds from said speaker upon activation of said alarm;
   a transmitter connected to said first microprocessor; and
   a wristband having a second microprocessor, a receiver connected to said second microprocessor for receiving signals from said transmitter and a vibration unit connected to said second microprocessor for activation by said second microprocessor upon activation of said alarm.

15. The children's potty alarm of claim 14 further comprising a cover carried by said base and at least partially covering said simulated bedroom or bathroom setting.

16. The children's potty alarm of claim 15 further comprising a control panel provided in said base and connected to said first microprocessor, a control panel access slot provided in said base adjacent to said control panel and a panel cover detachably closing said control panel access slot.

\* \* \* \* \*